United States Patent
Gangadharan et al.

(10) Patent No.: US 12,363,620 B2
(45) Date of Patent: Jul. 15, 2025

(54) UNIFIED ARCHITECTURE FOR OUTER TRANSCEIVER OPERATION

(71) Applicant: EdgeQ, Inc., Santa Clara, CA (US)

(72) Inventors: Hariprasad Gangadharan, Karnataka (IN); Sriram Rajagopal, Karnataka (IN); Umesh Dattatraya Nimbhorkar, Karnataka (IN); Deepak Kunnathkulangara Padmanabhan, Kerala (IN); Karthikeyan Pandiyarajan, Bangalore (IN)

(73) Assignee: EdgeQ, Inc., Santa Clara, CA (US)

( * ) Notice: Subject to any disclaimer, the term of this patent is extended or adjusted under 35 U.S.C. 154(b) by 410 days.

(21) Appl. No.: 18/078,946

(22) Filed: Dec. 10, 2022

(65) Prior Publication Data

US 2024/0196312 A1    Jun. 13, 2024

(51) Int. Cl.
| | |
|---|---|
| H04W 72/04 | (2023.01) |
| H04L 5/00 | (2006.01) |
| H04W 48/16 | (2009.01) |
| H04W 48/18 | (2009.01) |
| H04W 76/00 | (2018.01) |
| H04W 88/08 | (2009.01) |

(52) U.S. Cl.
CPC ......... *H04W 48/16* (2013.01); *H04L 5/0048* (2013.01); *H04W 48/18* (2013.01)

(58) Field of Classification Search
None
See application file for complete search history.

(56) References Cited

U.S. PATENT DOCUMENTS

| | | |
|---|---|---|
| 2012/0120821 A1 | 5/2012 | Kazmi et al. |
| 2021/0184795 A1 | 6/2021 | Ibars Casas et al. |
| 2022/0353652 A1 | 11/2022 | Fechtel et al. |

OTHER PUBLICATIONS

Yuan-Shin et al. (CORDIC-Based Architecture with Channel State Information for OFDM Baseband Receiver by Chia-Sheng Peng, Student Member, IEEE, Yuan-Shin Chuang, A and Kuei-Ann Wen, Senior Member, IEEE) (Year: 2005).*

Yun Wang (Software-Defined Radio Receiver Design and Development for China Digital Radio (CDR), Yun Wang, Delft University of Technology Telecommunications & Sensing Systems Department of EEMCS Delft University of Technology) (Year: 2015).*

Maximilian Matthé (Multiple-Input Multiple-Output Detection Algorithms for Generalized Frequency Division Multiplexing) (Year: 2018).*

(Continued)

*Primary Examiner* — Maharishi V Khirodhar
(74) *Attorney, Agent, or Firm* — Michael North

(57) ABSTRACT

Embodiments of unified wireless architecture are disclosed to support multiple types of outer transceiver operation across different wireless standards. In the unified wireless architecture, processing chains of different RAT specifications may be configured using a single digital signal processing or hardware accelerator chain. An interface/boundary between a signal processing engine (SPE) and an outer transceiver (OTRX) may be identified as complex number data samples for all RATs. The OTRX may take RAT-specific unique processing steps away from SPE. Pipelined hardware Accelerator blocks may be configured to perform operations across different RATs with controls over bandwidth, latency, and power.

20 Claims, 8 Drawing Sheets

(56) References Cited

OTHER PUBLICATIONS

Lai et al. (Implementation of a C-V2X Receiver on an Over-The-Air Software-Defined-Radio Platform with OpenCL, Ming-Hsuan Lai and Tzi-Dar Chiueh Graduate Institute of Electronics Engineering, National Taiwan University, Taipei, Taiwan) (Year: 2018).*
International Search Report and Written Opinion of the International Searching Authority mailed Sep. 22, 2023 in related PCT application No. PCT/US2023/026659, (13 pgs).
Narayanan et al., "Revisiting Software Defined Radios in the IoT Era", WiTech, 2016, available from the Internet, <URL://efaidnbmnnnibpcajpcglclefindmkaj/https://www.witechlab.com/assets/revisiting-software-defined_new.pdf>, (7 pgs).
Notice of allowance mailed Aug. 27, 2024 in related Taiwanese patent application No. 112145331, (3 pgs).

* cited by examiner

UNIFIED ARCHITECTURE FOR OUTER TRANSCEIVER OPERATION

TECHNICAL FIELD

The present disclosure relates generally to a unified wireless architecture that supports wireless communication across different wireless standards. More particularly, the present disclosure relates to unified wireless architecture that supports multiple types of outer transceiver operation across different wireless standards.

BACKGROUND

The importance of wireless communication in today's society is well understood by one of skill in the art. Advances in wireless technologies have resulted in the ability to interface with and service many different types of wireless devices using a variety of different types of wireless signals. These advances have resulted in multiple wireless standards defining parameters for implementing and maintaining wireless channels. These different standards also allocate different wireless spectrums for their use and often require different operations to implement corresponding wireless connectivity.

Different radio access technologies (RATs), e.g., 5G New Radio (NR), 4G Long Term Evolution (LTE), or wireless local-area network (WLAN), specify PHY layer processing for transmitting/receiving (TX/RX) of bits from/to higher layers sent/received over the air. As spectrum becomes an expensive resource, there is a requirement to converge some of these technologies. There are functional commonalities that could be found across these specifications, along with some unique computational steps.

It is desirable to identify the sections in the processing chains of each RAT specification for re-arrangement in certain possible scenarios such that a single digital signal processing or hardware accelerator chain may be configured to perform this process with minimal uniqueness for a given RAT or given RATs.

The interface/boundary between a signal processing engine (SPE) and an outer transceiver (OTRX) may be identified as complex number data samples, which are the same for all RATs. It is desirable to have pipelined hardware accelerator blocks that can be configured to perform operations for across different RATs with controls over bandwidth, latency, and power.

Accordingly, what is needed are systems, devices and methods that address the above-described needs.

BRIEF DESCRIPTION OF THE DRA WINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
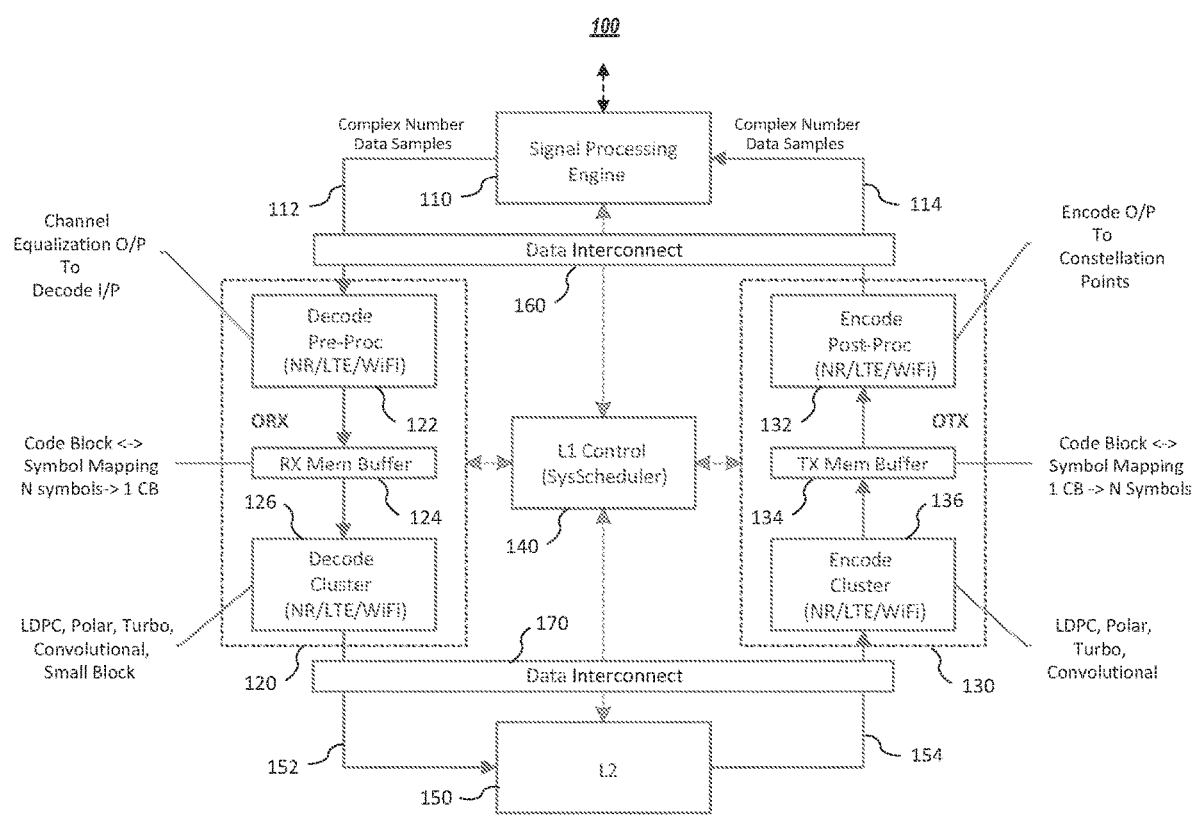
FIG. 1 ("FIG. 1") depicts a functional view for OTRX in a wireless communication device, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Described hereinafter are embodiments of unified wireless architecture that supports multiple types of outer transceiver operation across different wireless standards. In the unified wireless architecture, processing chains of different RAT specifications may be configured using a single digital signal processing or hardware accelerator chain. An interface/boundary between a signal processing engine (SPE) and an outer transceiver (OTRX) may be identified as complex number data samples for all RATs. The OTRX may take the RAT-specific unique processing steps away from the SPE. Pipelined hardware Accelerator blocks may be configured to perform operations across different RATs with controls over bandwidth, latency, and power. Application of the disclosed embodiments may result in a uniform and clean interface between an SPE and an OTRX, as well as a uniform abstraction for hardware accelerators through RX/TX task managers.

A. OTRX Functional View

FIG. 1 depicts a functional view for an OTRX in a wireless communication device, according to embodiments of the present disclosure. The wireless communication device 100 comprises a signal processing engine (SPE) 110, an outer receiver (ORX) 120, an outer transmitter (OTX) 130, a first layer (also referred to as the Physical layer, PHY, or L1) controller 140, and a second layer (L2) 150. For ingress data flow, the SPE 110 performs various signal processing operations, such as channel estimation, measurements, etc., to generate an SPE output 112 comprising a plurality of complex number data samples. For egress data flow, the SPE 110 receives from the OTX 130 an SPE input 114 comprising a plurality of complex number data samples for various signal processing operations in a preparation for data transmission. In digital communication, a constellation diagram is commonly used to represent a signal modulated by a digital modulation scheme, which displays the signal as a two-dimensional xy-plane scatter diagram in the complex plane at symbol sampling instants.

The L1 controller 140 operatively couples to the SPE 110, the ORX 120, the OTX 130, and the L2 150 for RX/TX command communication and OTRX operation scheduling. The ORX 120 may comprise a decoder pre-processing module 122, a receiver (RX) buffer 124, and a decoder cluster 126. The decoder pre-processing module 122 receives, via a first data interconnect interface 160, the SPE output 112 for decoding pre-processing, e.g., channel equalization operation, etc. The RX buffer 124 implements symbol-to-code block (CB) mapping regarding a pre-processing output from the decoder pre-processing module 122 to generate one or more CBs, which are individually decoded in the decoder cluster 126 into decoded data using various decoding schemes, such as low-density parity check (LDPC) decoding, polar decoding, turbo decoding, convolutional decoding, small block decoding, etc. Decoded data 152 generated by the decoder cluster 126 are sent, via a second data interconnect interface 170, to the L2 module 150 for subsequent data processing.

The OTX 130 may comprise an encoder post-processing module 132, a transmitter (TX) buffer 134, and an encoder cluster 136. The encoder cluster 136 receives, via a second data interconnect interface 170, egress data 514 from the L2 module 150 for encoding operation using various encoding schemes, such as LDPC encoding, polar encoding, turbo encoding, convolutional encoding, etc. The TX buffer 134 implements CB to symbol mapping for encoded data generated by the encoder cluster 136 to generate a plurality of symbols, which are post-processed in the encoder post-processing module 132 to generate an encoder output 114 comprising a plurality of constellation points. In one or more embodiments, the encoder output 114 may be sent, via the first data interconnect interface 160, to the SPE 110 for subsequent signal processing.

Majority of SPE processing may be RAT agnostic. The SPE applies standard algorithms and processing steps for all RATs (FFT/IFFT, pre-coding, channel estimate, channel equalization). Typically, only pilot map (for WLAN) and demodulation reference signal (DMRS) symbols (for NR/LTE) for channel estimation references are used for firmware (FW) configuration. In one or more embodiments, data tone mapping may be different for different RATs, and the FM may be configurable to support such RAT-specific tone mapping. A unified SPE processing for various RATs may improve system efficiency by avoiding varied processing or control flows. Standard-specific tone or LLR level processing may be done in a unified way in an OTRX or a bit processing engine (BPE).

In one or more embodiments, filling the RX buffer 124 or using the TX buffer 134 for tones (with complex number data) per layer may be configured in the same format, between fast Fourier transform (FFT) and inverse fast Fourier transform (IFFT), for various RATs, thus providing a clean RAT-agnostic data interface with the OTRX.

The decoder cluster 126 and the encoder cluster 136 are configured to implement decoding or encoding processing across various RATs using different decoding or encoding schemes. The encoding/decoding data paths for different RATs may have one or more shared modules for improved resource utilization efficiency. Details of resource sharing on encoding/decoding data paths are shown in the following Sections.

B. ORX Data Paths

A decoder pre-processing module may be used to process stand-specific tasks. Pre-processing operation may be slightly different when such an operation is implemented in an access point (AP)/gNodeB/eNodeB or in a client device/user equipment (UE). For WLAN data, the decoder pre-processing module may perform pilot tone removal, tone de-interleaving, such as LDPC tone demapping and binary convolutional code (BCC) tone level de-interleaving, BCC Bit de-interleaving, dual-carrier modulation (DCM). For NR/LTE data, the decoder pre-processing module in an AP/gNodeB/eNodeB may perform uplink shared channel (UL-SCH) demultiplexing and de-interleaving, descrambling, etc. The decoder pre-processing module may also be configured to perform some common tasks, e.g., layer demapping, stream segment deparsing, constellation demapping, etc.

Figure 2:
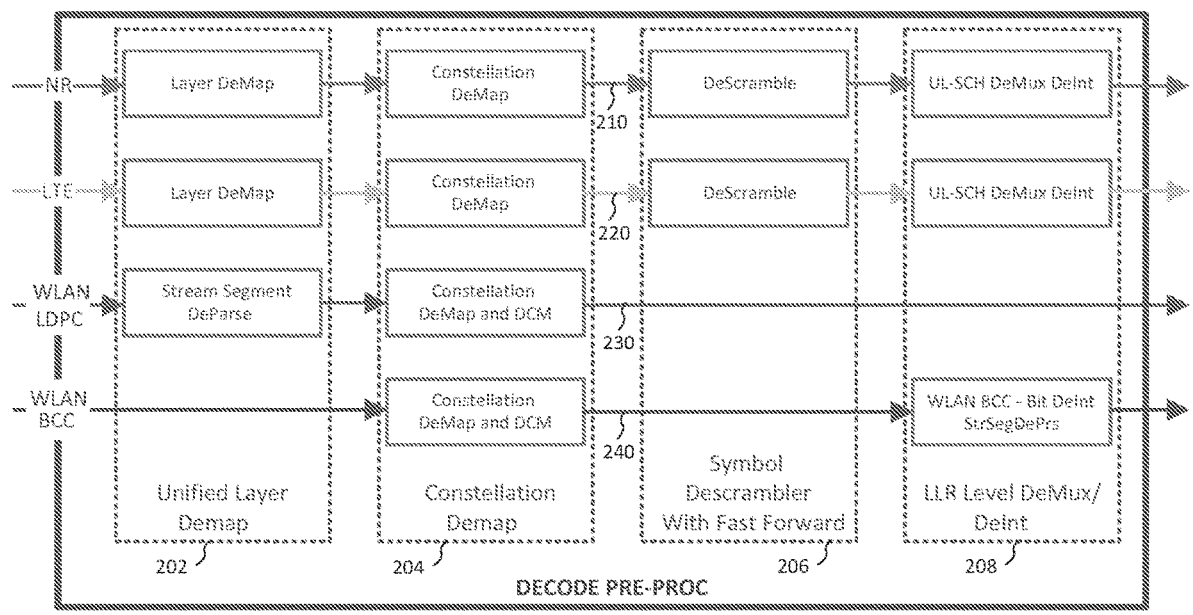
FIG. 2 depicts a block diagram for decoder pre-processing, according to embodiments of the present disclosure.

FIG. 2 depicts a block diagram for decoder pre-processing, according to embodiments of the present disclosure. The decoder pre-processing module 200 may be configured to encapsulate all standard specific tone or bit level processing into separate unified HW accelerators to provide decoder pre-processing data paths across various RATs, e.g., a data path 210 for 5G NR, a data path 220 for 4G LET, a data path 230 for WLAN LDPC, and a data path 240 for WLAN binary convolutional code (BCC).

In one or more embodiments, the decoder pre-processing module 200 may comprise a unified layer demapping block 202, a constellation demapping block 204, a symbol descrambler 206, and a log-likelihood ratio (LLR)-level demultiplexer/deinterleaver 208, with at least one or more of these components shared for different decoder pre-processing data paths.

As shown in FIG. 2, the unified layer demapping block 202 may be configured to implement layer demapping for the data path 210 and/or the data path 220, or to implement stream segment deparsing for the data path 230. The constellation demapping block 204 may be configured to implement constellation demapping for the data path 210 and/or the data path 220, or to implement constellation demapping and DCM for the data path 230 and/or the data path 240. The symbol descrambler 206 may be configured to implement fast-forward symbol descrambling for the data path 210 and/or the data path 220, and the LLR-level demultiplexer/deinterleaver 208 may be configured to implement UL-SCH demultiplexing/deinterleaving for the data path 210 and/or the data path 220, or to implement bit deinterleaving and stream/segment deparsing (StrSegDeprs) for the data path 240.

A decoder cluster may be used to process various decoding tasks. For WLAN BCC data, a Viterbi decoder may be re-used across users for every symbol by overlap and discard mechanism. At the start of current symbol, the Viterbi decoder restores the trellis state from the end of previous symbol. For NR/LTE data, the decoder cluster may be configured to perform UL-SCH demultiplexing and de-interleaving, descrambling, etc. The decoder cluster may also be configured to perform some common tasks, e.g., layer demapping, stream segment deparsing, constellation demapping, etc.

Figure 3:
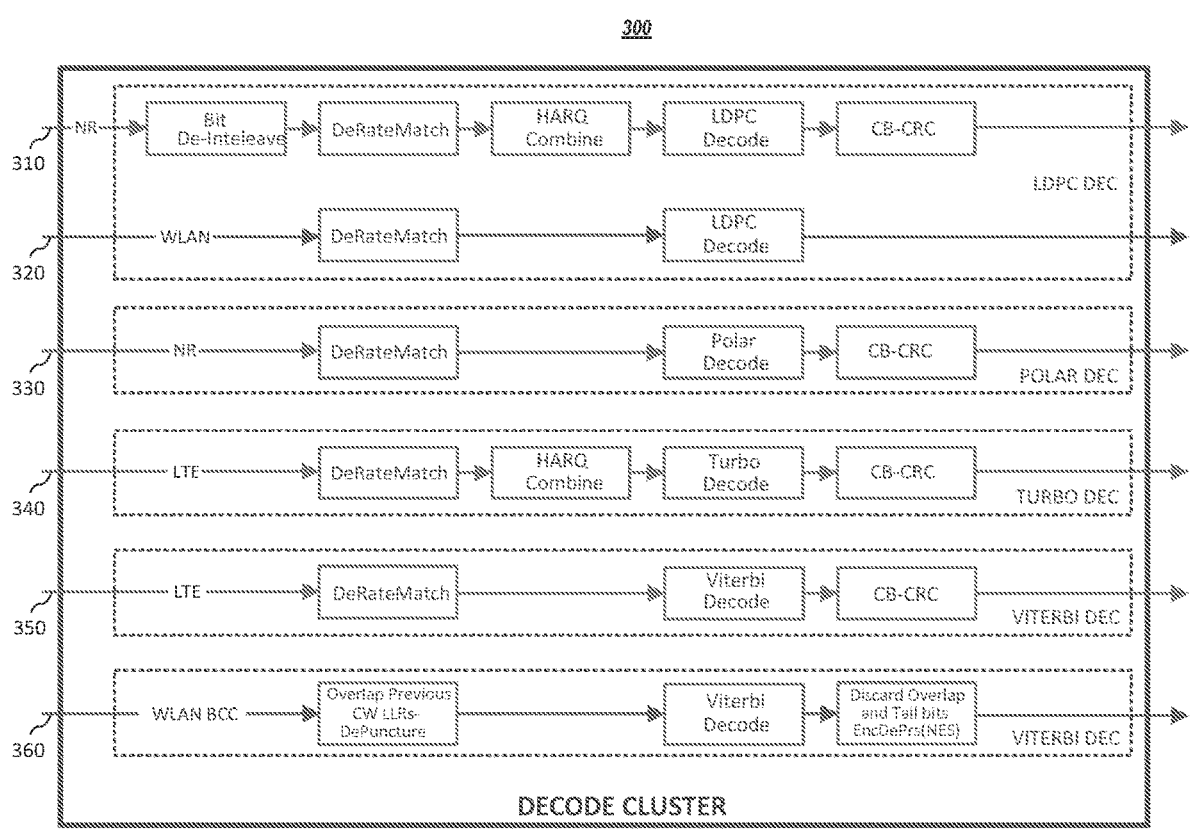
FIG. 3 depicts a block diagram of a decoding cluster, according to embodiments of the present disclosure.

FIG. 3 depicts a block diagram of a decoding cluster, according to embodiments of the present disclosure. Similar to the decoder pre-processing module 200, the decoding cluster 300 may be configured to handle different decoding data paths across various RATs using different decoding schemes, e.g., a decoding data path 310 for 5G NR using LDPC decoding, a decoding data path 320 for WLAN using LDPC decoding, a decoding data path 330 for 5G NR using polar decoding, a decoding data path 340 for 4G LET using turbo decoding, a decoding data path 350 for 4G LET using Viterbri decoding, and a decoding data path 360 for WLAN BCC using Vitebri decoding. Viterbi decoding is a decoding scheme using the Viterbi algorithm for decoding a bit stream that has been encoded using a convolutional code or trellis code.

In certain RATs, different coding schemes are used for different planes. In a 5G NR communication system, LDPC is used for data plane, and polar code is used for control plane. The decoding cluster 300 may also be configured to handle different decoding data paths for different channels (e.g., user channel or control channel) across various RATs. Different decoding data paths using the same decoding schemes may involve similar functional blocks. As an example in FIG. 3, both the decoding data path 310 for 5G NR and the decoding data path 320 for WLAN involve LDPC decoding, and may even share some blocks, e.g., the derate matcher (DeRateMatch) and the LDPC decoding block (LDPC Decode), although the shared blocks may operate differently in handing the 5G NR data and WLAN data.

In one or more embodiments, some functional blocks may be shared among different decoding data paths to implement similar functions. As an example in FIG. 3, a code block cyclic redundancy check (CB-CRC) block may be used or scheduled to handle the CRC process among different decoding data paths, such as the decoding data paths 310, 330, 340, and 350, even though these decoding data paths have different decoding schemes.

C. OTX Data Paths

Figure 4:
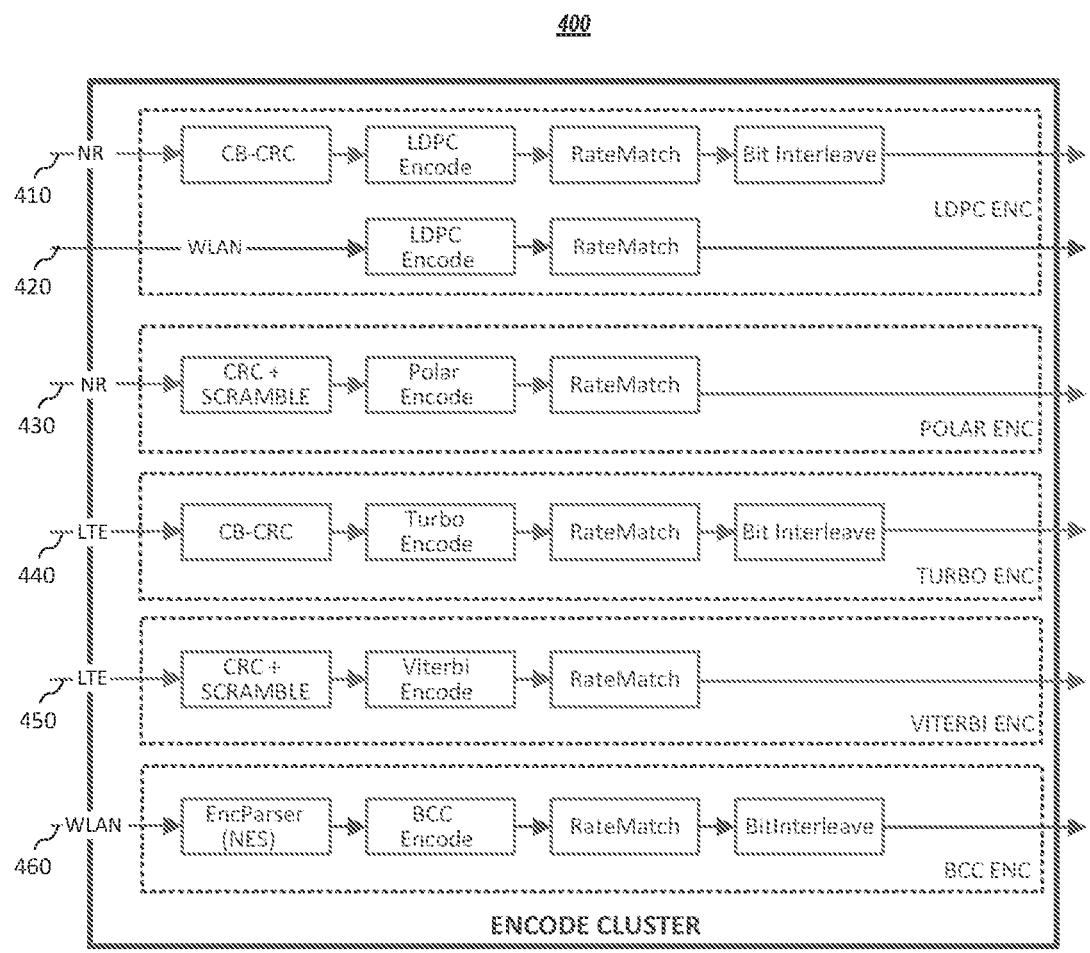
FIG. 4 depicts a block diagram of an encoding cluster, according to embodiments of the present disclosure.

FIG. 4 depicts a block diagram of an encoding cluster, according to embodiments of the present disclosure. The encoding cluster 400 may be configured to handle different encoding data paths across various RATs using different encoding schemes, e.g., an encoding data path 410 for 5G NR using LDPC encoding, an encoding data path 420 for WLAN using LDPC encoding, an encoding data path 430 for 5G NR using polar encoding, an encoding data path 440 for 4G LET using turbo encoding, an encoding data path 450 for 4G LET using Viterbri encoding, and an encoding data path 460 for WLAN BCC using Vitebri encoding, which is a commonly used coding and modulation method for digital data transmission.

Similar to the decoding cluster 300, the encoding cluster 400 may also be configured to handle different decoding data paths for different channels (e.g., user channel or control channel) across various RATs. Different decoding data paths using the same decoding schemes may involve similar functional blocks. As an example in FIG. 4, both the encoding data path 410 for 5G NR and the encoding data path 420 for WLAN involve LDPC encoding, and may share some blocks, e.g., the LDPC encoding block (LDPC Encode), although the shared blocks may operate differently in handing the 5G NR data and WLAN data.

In one or more embodiments, some functional blocks may be shared among different decoding data paths to implement similar functions. As an example in FIG. 4, a CB-CRC block may be used or scheduled to handle CRC processing among different encoding data paths, such as the encoding data paths 410 and 440; a bit interleaving block may be used or scheduled to handle different encoding data paths, such as the encoding data paths 410 and 440, even though these encoding data paths have different encoding schemes.

Figure 5:
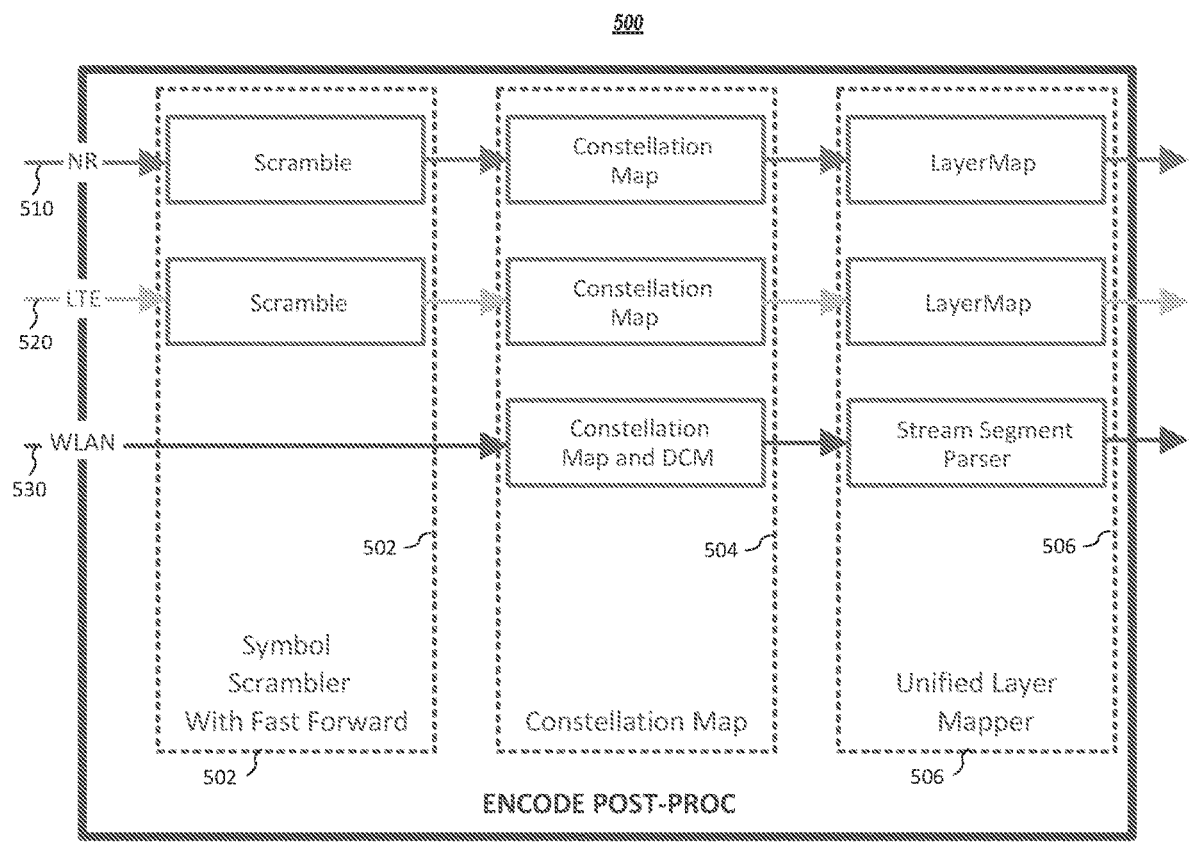
FIG. 5 depicts a block diagram for encoder post-processing, according to embodiments of the present disclosure.

FIG. 5 depicts a block diagram for encoder post-processing, according to embodiments of the present disclosure. The encoder post-processing module 500 may be configured to encapsulate all standard specific tone or bit level processing into separate unified HW accelerators to provide encoder post-processing data paths across various RATs, e.g., a data path 510 for 5G NR, a data path 520 for 4G LET, a data path 530 for WLAN. The encoder post-processing module 500 may be configured to implement functions for AP/gNobeB/eNodeB or for Client Devices/UEs.

In one or more embodiments, the decoder pre-processing module 200 may comprise a symbol scrambler 502, a constellation mapping block 504, and a unified layer mapper 506, with at least one or more of these components shared for different encoder post-processing data paths. Depending on data paths, a shared component may be configured to operate similarly or differently. For example, the unified layer mapper 506 may be configured to perform layer mapping for the data paths 510 and 520, and to perform stream segment parsing for the data path 530.

D. OTRX Task Management

Figure 6:
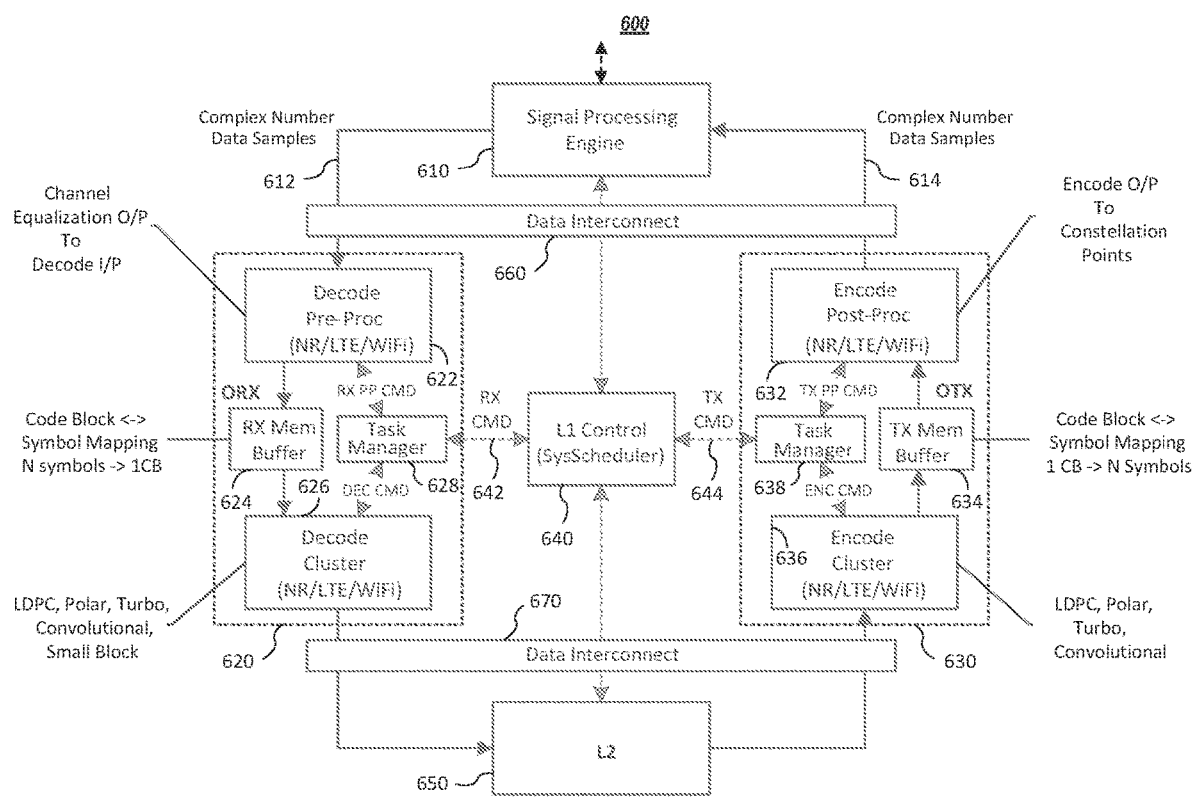
FIG. 6 depicts a block diagram for OTRX task management, according to embodiments of the present disclosure.

FIG. 6 depicts a block diagram for OTRX task management, according to embodiments of the present disclosure. The wireless communication device 600 comprises an SPE 610, an ORX 120, an OTX 630, an L1 controller 640, and a second layer (L2) 650. For ingress data flow, the SPE 610 performs various signal processing operations to generate an SPE output 612 comprising a plurality of complex number data samples. For egress data flow, the SPE 610 receives from the OTX 630 an SPE input 614 comprising a plurality of complex number data samples for various signal processing operations in preparation for data transmission.

The ORX 620 may comprise a decoder pre-processing module 622, a receiver (RX) buffer 624, and a decoder cluster 626. The decoder pre-processing module 622 receives, via a first data interconnect interface 660, the SPE output 612 for decoding pre-processing. The RX buffer 624 implements symbol-to-code block (CB) mapping regarding a pre-processing output from the decoder pre-processing module 622 to generate one or more CBs, which are decoded in the decoder cluster 626 into decoded data using various decoding schemes. Decoded data generated by the decoder cluster 626 are sent, via a second data interconnect interface 670, to the L2 module 650 for subsequent data processing.

The OTX 630 may comprise an encoder post-processing module 632, a TX buffer 634, and an encoder cluster 636. The encoder cluster 636 receives, via a second data interconnect interface 670, egress data from the L2 module 650 for encoding operation using various encoding schemes. The TX buffer 634 implements CB to symbol mapping for encoded data generated by the encoder cluster 636 to generate a plurality of symbols, which are post-processed in the encoder post-processing module 632 to generate an encoder output 614 comprising a plurality of constellation points. In one or more embodiments, the encoder output 614 may be sent, via the first data interconnect interface 660, to the SPE 610 for subsequent signal processing.

The L1 controller 640 operatively couples to the SPE 110, an ORX task manager 628 in the OTX 620, an OTX task manager 638 in the OTX 630, and the L2 150 for RX/TX command communication and OTRX operation scheduling. The L1 controller 640 sends the ORX task manager 628 one or more RX commands (RX_CMD) 642, which may comprise RAT type (NR/LET/WLAN), slot information for NR/LTE, symbol information for WLAN, SPE buffer pointers per layer for slot/symbol per transport block (TB) or user, number of layers or spatial streams, modulation coding scheme (MCS), UL-SCH demultiplexing information for NR/LET, Uplink Control Information (UCI) tone, resource unit (RU) or bandwidth (BW) information for WLAN, L2 and hybrid automatic repeat request (HARQ) buffer pointers, etc. The RX commands 642 may be given per TB for NR or LTE signal, or per user for WLAN signal. It shall be noted that when the L1 controller 640 is for a gNode/enodeB, TX commands for gNode/enodeB correspond to downlink (DL) for a UE, while RX commands for gNode/enodeB correspond to uplink (UL) for a UE.

Similarly, the L1 controller 640 sends the OTX task manager 638 one or more TX commands (TX_CMD) 644, which may comprise RAT type (NR/LET/WLAN), slot information for NR/LTE, symbol information for WLAN, SPE buffer pointers per layer for slot/symbol per TB or user, number of layers or spatial streams, MCS, resource unit (RU) or bandwidth information for WLAN, L2 and HARQ buffer pointers, etc. The TX commands 644 may be given per TB for NR or LTE signal, or per user for WLAN signal.

Upon receiving the commands from the L1 controller 640, the ORX task manager 628 and the OTX task manager 638 perform various ORX or OTX task managing operations, including but not limited to breaking down slot/symbol level commands from the L1 controller 640 into CB or symbol tasks for HW accelerators, distributing tasks among data path resources, pushing configurations and collecting status across pipeline stages of each data path, interrupting the L1 controller 640 upon task completion, commanding entry and exiting queues to manage firmware (FW) latencies, etc.

In one or more embodiments, the ORX task manager 628 may send one or more RX pro-processing commands (RX_PP_CMDs) to the decoder pre-processing module for RX pro-processing task implementation and one or more decoding commands (DEC_CMDs) to the decoder cluster for decoding task implementation. The RX_PP_CMDs may be given per CB or symbol level, and may comprise one or more of: RAT type (NR/LET/WLAN), SPE buffer pointers per layer for slot/symbol per TB or user, number of symbols for LTE, number of layers or spatial streams, MCS, UL-SCH demultiplexing information for NR/LET, UCI tone, descrambler initiation and fast forward, RU or BW information for WLAN, RX buffer pointers for LLR writes, task context information for save/restore across code block calls from different users or TBs, etc.

The DEC_CMDs may comprise one or more of: RAT type (NR/LET/WLAN), forward error correction (FEC) type, coding scheme (LDPC, turbo, etc.), RX buffer pointers for LLR read, decoder parameters (rate-matched output variable RM_E, codeword bit number $N_{cb}$, z-factor, filler, HARQ controls, iterations, algorithm selection, etc.), overlap/discard rate, traceback length, HARQ compression and decompression information, soft output controls, HARQ buffer information, L2 data or L1 controller (UCI) buffer information, etc.

In one or more embodiments, the OTX task manager 638 may send one or more TX post-processing commands (TX_PP_CMDs) to the encoder post-processing module for TX encoder post-processing task implementation and one or more encoding commands (ENC_CMDs) to the encoder cluster for encoding task implementation. The ENC_CMDs may comprise one or more of: encoding type (NR/LET/WLAN), FEC type, coding scheme (LDPC, turbo, etc.), TX buffer pointers for encoder output writes, encoder parameters (RM_E, codeword bit number $N_{cb}$, z-factor, filler, rate, etc.), bit interleaving row×column information, L2 data or L1 controller (UCI) buffer points for input bit read, etc.

The TX_PP_CMDs may be given per symbol level, and may comprise one or more of: RAT type (NR/LET/WLAN), SPE buffer pointers per layer for slot/symbol per TB or user, number of symbols for LTE, number of layers or spatial streams, MCS, RU or BW information for WLAN, tone interleaving row×column information, TX buffer pointers for encoded bits, task context information for save/restore across symbol calls from different users or TBs, etc.

As shown in the exemplary embodiment in FIG. 6, a common interface/boundary is identified across various radio access technologies (RATs), e.g., 5G NR, 4G LTE, or Wi-Fi, for data and control planes at the boundary between the SPE and the OTX/ORX. Complex number data samples are used for cross-interface communication. In one or more embodiments, the decoder pre-processing module 622 and the encoder post-processing module 632 may be configured to encapsulate various standard-specific tone or bit level processing into separate unified HW accelerators (decoder pre-processing module and/or encoder post-processing). These HW accelerators may be individual pipeline stages that OTX/ORX task managers 628/638 may handle based on requests from the L1 controller 640.

In one or more embodiments, a control firmware may get a unified command interface (through abstraction provided by the RX/TX task manager) for various RATs L1 bit level processing (RAT/TX/RX/Data/Control), which comprises one or more of:

a. throughput/latency management across RATs based on data rates, user allocation, etc.;
b. power management through clock/frequency control for data path pipelines based on data rates; and
c. presenting CMD queues with Quality of service (QOS) parameters, such as priority, throughput requirement, etc., for command execution flexibility in the RX/TX task manager.

Figure 7:
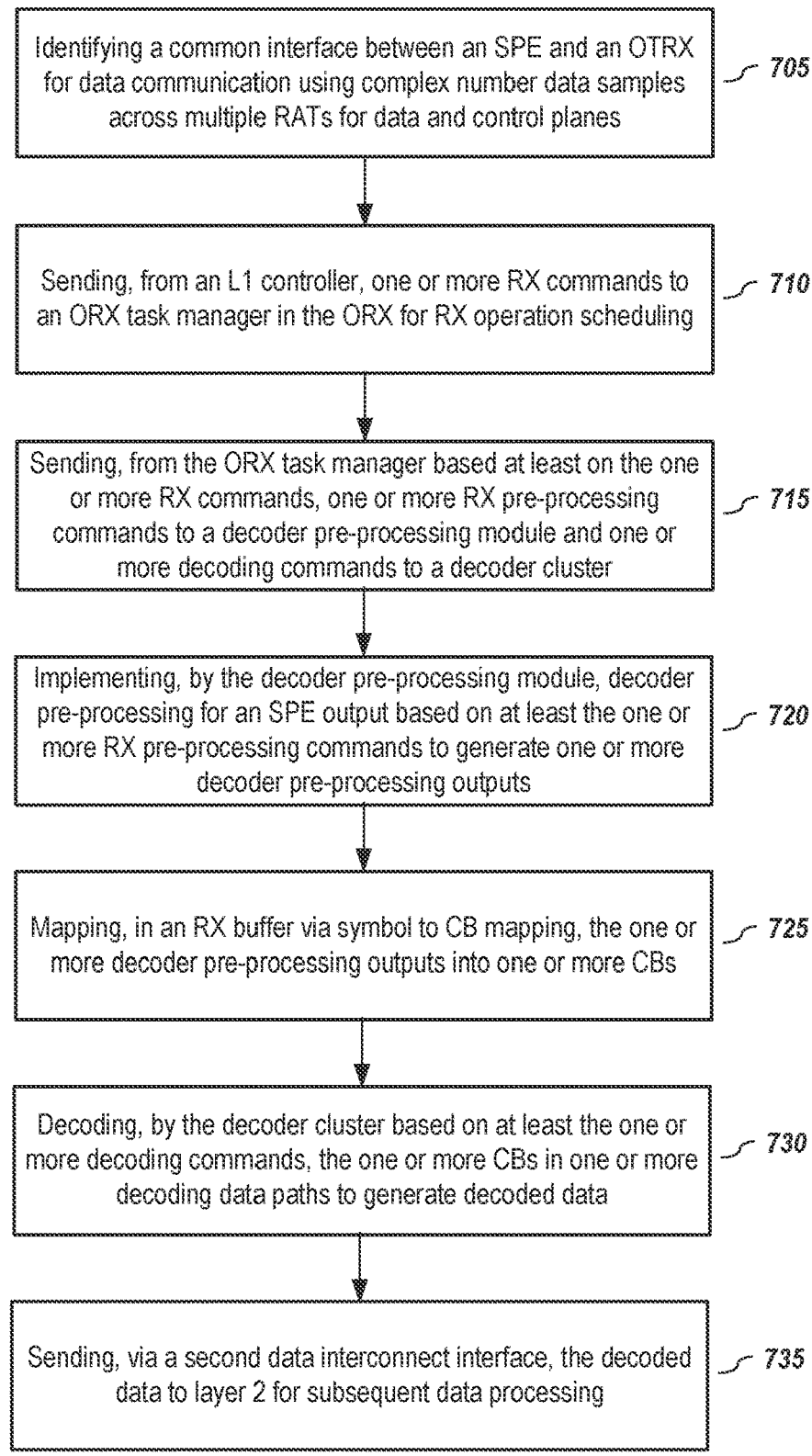
FIG. 7 depicts a process for OTRX task management in a data-receiving direction, according to embodiments of the present disclosure.

FIG. 7 depicts a process for OTRX task management in a data-receiving direction, according to embodiments of the present disclosure. In step 705, a common interface between an SPE and an OTRX for data communication using complex number data samples is identified across multiple RATs for data and control planes. The common interface may be referred as a first data interconnect interface. In step 710, an L1 controller sends one or more RX commands to an ORX task manager in the ORX for RX operation scheduling. In step 715, the ORX task manager sends, based at least on the one or more RX commands, one or more RX pre-processing commands to a decoder pre-processing module in the ORX for decoder pre-processing scheduling and operation and one or more decoding commands to a decoder cluster in the ORX for decoding scheduling and operation. In step 720, the decoder pre-processing module implements decoder pre-processing for an SPE output, received from the SPE via the common interface, based on at least the one or more RX pre-processing commands to generate one or more decoder pre-processing outputs comprising multiple symbols. The decoder pre-processing may comprise implementing standard-specific or RAT-specific processing tasks or implementing common RX pre-processing tasks in one or more RX pre-processing data paths, with each RX pre-processing data path corresponding to one RAT. In step 725, the one or more decoder pre-processing outputs are mapped, in an RX buffer via symbol-to-code block (CB) mapping, into one or more CBs. In step 730, the one or more CBs are decoded, by the decoder cluster based on at least the one or more decoding commands, in one or more decoding data paths to generate decoded data. In step 735, the decoded data are sent, via a second data interconnect interface, to layer 2 for subsequent data processing.

Figure 8:
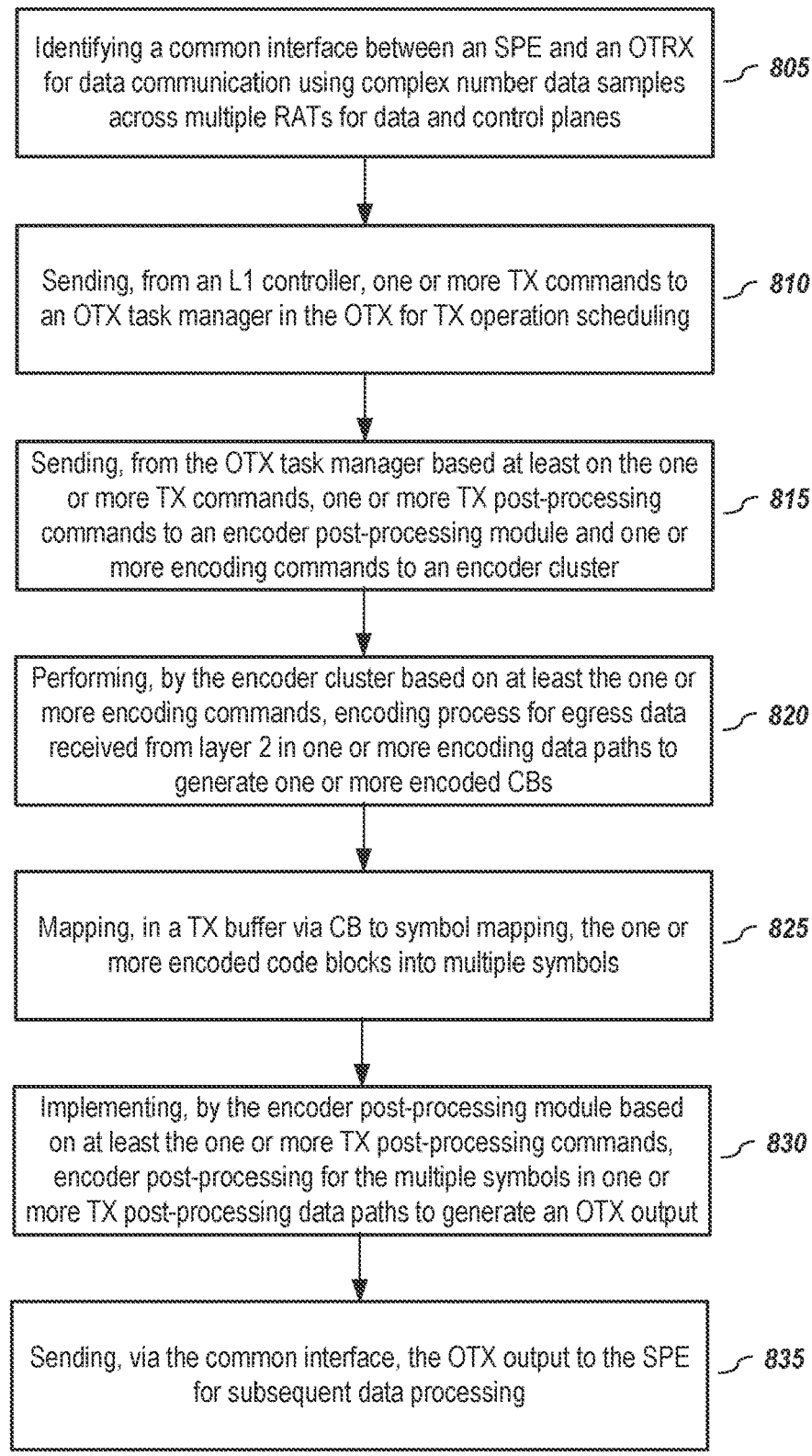
FIG. 8 depicts a process for OTRX task management in a data-transmitting direction, according to embodiments of the present disclosure.

FIG. 8 depicts a process for OTRX task management in a data-transmitting direction, according to embodiments of the present disclosure. In step 805, a common interface between an SPE and an OTRX for data communication using complex number data samples is identified across multiple RATs for data and control planes. The common interface may be referred to as a first data interconnect interface. In step 810, an L1 controller sends one or more TX commands to an OTX task manager in the OTX for TX operation scheduling. In step 815, the OTX task manager sends, based on the one or more TX commands, one or more TX pre-processing commands to an encoder post-processing module in the OTX for encoder post-processing scheduling and operation and one or more encoding commands to an encoder cluster in the OTX for encoding scheduling and operation. In step 820, the encoder cluster performs, based on at least the one or more encoding commands, encoding process for egress data received from layer 2 via the second data interconnect interface in one or more encoding data paths to generate one or more encoded CBs. In step 825, the one or more encoded code blocks are mapped, in a TX buffer via CB to symbol mapping, into multiple symbols. In step 830, the encoder post-processing module implements encoder post-processing for the multiple symbols in one or more TX post-processing data paths based on at least the one or more TX post-processing commands to generate an OTX output comprising multiple complex number data samples. In step 835, the OTX output is sent, via the common interface, as an input to the SPE for subsequent data processing.

Although FIG. 7 and FIG. 8 describe OTRX task management in the data-receiving direction and data transmitting direction separately, one skilled in the art shall understand the steps shown in FIG. 7 and FIG. 8 may be implemented independently, sequentially, or simultaneously.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher-level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for unified signal processing management comprising:
    identifying a common interface between a signal processing engine (SPE) and an outer receiver (ORX) for data communication using complex number data samples across multiple radio access technologies (RATs) for data and control planes;
    sending, from a first layer (L1) controller, one or more receiving (RX) commands to an ORX task manager in the ORX for RX operation scheduling; and
    sending, from the ORX task manager based at least on the one or more RX commands, one or more RX pre-processing commands to a decoder pre-processing module in the ORX for decoder pre-processing scheduling; and
    implementing, by the decoder pre-processing module, decoder pre-processing for an SPE output based on at least the one or more RX pre-processing commands to generate one or more decoder pre-processing outputs, the decoder pre-processing module encapsulates various standard-specific tone or bit level processing into separate unified accelerators for implementing one or more RAT-specific processing tasks in one or more RX pre-processing data paths.

2. The method of claim 1 further comprising:
    sending, from the ORX task manager based at least on the one or more RX commands, one or more decoding commands to a decoder cluster in the ORX for decoding scheduling;
    mapping, via symbol to code block (CB) mapping, the one or more decoder pre-processing outputs into one or more CBs; and
    decoding, by the decoder cluster based on at least the one or more decoding commands, the one or more CBs in one or more decoding data paths to generate decoded data.

3. The method of claim 2, wherein the one or more RX commands comprise one or more of:
    RAT type;
    slot information for NR/LTE;
    symbol information for WLAN;
    SPE buffer pointers per layer for slot/symbol per transport block (TB) or user;
    number of layers or spatial streams;
    modulation coding scheme (MCS);
    uplink shared channel (UL-SCH) demultiplexing information for NR/LET;
    Uplink Control Information (UCI) tone;
    resource unit (RU) or bandwidth (BW) information for WLAN; and
    layer 2 (L2) and hybrid automatic repeat request (HARQ) buffer pointers.

4. The method of claim 1, wherein:
    the multiple RATs comprise multiple standards among a group comprising at least 5G new radio (NR), 4G Long Term Evolution (LTE), and wireless local-area network (WLAN); and
    the SPE, the L1 controller, and the ORX are deployed in an access point (AP), a gNodeB, an eNodeB, a user equipment (UE), or a client device.

5. The method of claim 1, wherein implementing decoder pre-processing comprises one or more of:
    implementing standard-specific or RAT-specific processing tasks; and
    implementing common RX pre-processing tasks.

6. The method of claim 1 wherein the one or more RX commands are sent per transport block (TB) for NR or LTE signal, or per user for WLAN signal.

7. The method of claim 1, wherein the ORX task manager is configured to perform one or more of:
    breaking down slot/symbol level commands from the L1 controller into code block (CB) or symbol tasks for hardware accelerators;
    distributing tasks among data path resources;
    pushing configurations and collecting status across pipeline stages of each data path;
    interrupting the L1 controller upon task completion; and
    commanding entry and exiting queues to manage firmware (FW) latencies.

8. A method for unified signal processing management comprising:
    identifying a common interface between a signal processing engine (SPE) and an outer transmitter (OTX) for data communication using complex number data samples across multiple radio access technologies (RATs) for data and control planes;
    sending, from a first layer (L1) controller, one or more transmitting (TX) commands to an OTX task manager in the OTX for TX operation scheduling; and
    sending, from the OTX task manager based at least on the one or more TX commands, one or more TX post-processing commands to an encoder post-processing module in the OTX for encoder post-processing scheduling; and
    implementing, by the encoder post-processing module based on at least the one or more TX post-processing commands, encoder post-processing for multiple symbols in one or more TX post-processing data paths to generate an OTX output, the encoder post-processing module encapsulates various standard-specific tone or bit level processing into separate unified accelerators for implementing one or more RAT-specific processing tasks in one or more TX post-processing data paths.

9. The method of claim 8 further comprising:
sending, from the OTX task manager based at least on the one or more TX commands, one or more encoding commands to an encoder cluster in the OTX for encoding scheduling;
performing, by the encoder cluster based on at least the one or more encoding commands, encoding process in one or more encoding data paths for egress data received from layer 2 to generate one or more encoded code blocks (CBs);
mapping the one or more encoded CBs into the multiple symbols for encoder post-processing at the encoder post-processing module; and
sending, via the common boundary, the OTX output to the SPE for subsequent data processing.

10. The method of claim 8, wherein:
the multiple RATs comprise multiple standards among a group comprising at least 5G new radio (NR), 4G Long Term Evolution (LTE), and WLAN; and
the SPE, the L1 controller, and the OTX are deployed in an access point (AP), a gNodeB, an eNodeB, a user equipment (UE), or a client device.

11. The method of claim 8, wherein the one or more TX commands comprise one or more of:
RAT type;
slot information for NR/LTE;
symbol information for WLAN;
SPE buffer pointers per layer for slot/symbol per transport block (TB) or user;
number of layers or spatial streams;
modulation coding scheme (MCS);
resource unit (RU) or bandwidth (BW) information for WLAN; and
layer 2 (L2) and hybrid automatic repeat request (HARQ) buffer pointers.

12. The method of claim 8 wherein the one or more TX commands are sent per transport block (TB) for NR or LTE signal, or per user for WLAN signal.

13. The method of claim 8, wherein the OTX task manager is configured to perform one or more of:
breaking down slot/symbol level commands from the L1 controller into code block (CB) or symbol tasks for hardware accelerators;
distributing tasks among data path resources;
pushing configurations and collecting status across pipeline stages of each data path;
interrupting the L1 controller upon task completion; and
commanding entry and exiting queues to manage firmware (FW) latencies.

14. A system for wireless communication device comprising:
a signal processing engine (SPE);
a layer 1 (L1) controller that sends out one or more receiving (RX) commands and one or more transmitting (TX) commands;
an outer transceiver (OTRX) coupled to the SPE via a common interface for data communication using complex number data samples across multiple radio access technologies (RATs) for data and control planes, the OTRX comprising:
an outer receiver (ORX) comprising:
an ORX task manager that receives the one or more RX commands and sends one or more RX pre-processing commands for decoder pre-processing scheduling; and
a decoder pre-processing module that receives the one or more RX pre-processing commands, and implements decoder pre-processing in one or more RX pre-processing data paths for an SPE output based on at least the one or more RX pre-processing commands to generate one or more decoder pre-processing outputs; and
an outer transmitter (OTX) comprising:
an OTX task manager that receives the one or more TX commands and sends one or more TX post-processing commands for encoder post-processing scheduling; and
an encoder post-processing module that receives the one or more TX post-processing commands, and implements encoder post-processing in one or more TX post-processing data paths for multiple symbols to generate an OTX output to the SPE.

15. The system of claim 14, wherein:
the multiple RATs comprise multiple standards among a group comprising at least 5G new radio (NR), 4G Long Term Evolution (LTE), and wireless local-area network (WLAN); and
the SPE, the L1 controller, and the OTRX are deployed in an access point (AP), a gNodeB, an eNodeB, a user equipment (UE), or a client device.

16. The system of claim 14, wherein the SPE applies RAT-agnostic processing steps for signal processing.

17. The system of claim 14, wherein the decoder pre-processing module and the encoder post-processing module encapsulate various standard-specific tone or bit level processing into separate unified accelerators for implementing one or more RAT-specific processing tasks.

18. The system of claim 14, wherein the ORX further comprising:
an RX buffer that maps, via symbol to code block (CB) mapping, the one or more decoder pre-processing outputs into one or more CBs; and
a decoder cluster that decodes, based on at least one or more decoding commands, the one or more CBs in one or more decoding data paths to generate decoded data, the one or more decoding commands are sent from the ORX task manager based on at least the one or more RX commands for decoding scheduling.

19. The system of claim 14, wherein the OTX further comprising:
an encoder cluster that performs, based on at least one or more encoding commands, an encoding process in one or more encoding data paths for egress data received from layer 2 to generate one or more encoded code blocks (CBs), the one or more encoding commands are sent from the OTX task manager based at least on the one or more TX commands; and
a TX buffer that maps, via CB to symbol mapping, the one or more encoded CBs into the multiple symbols for encoder post-processing at the encoder post-processing module.

20. The system of claim 14, wherein the OTX task manager and the ORX task manager are configured to perform one or more of:
breaking down slot/symbol level commands from the L1 controller into code block (CB) or symbol tasks for hardware accelerators;
distributing tasks among data path resources;
pushing configurations and collecting status across pipeline stages of each data path;
interrupting the L1 controller upon task completion; and commanding entry and exiting queues to manage firmware (FW) latencies.

\* \* \* \* \*